R. K. BEAN.
FLY NET.
APPLICATION FILED NOV. 20, 1916.

1,218,829.

Patented Mar. 13, 1917.

Witness
Joseph DuBois

Inventor
Robert K. Bean
by H. R. Willson & Co.
Attorneys

UNITED STATES PATENT OFFICE.

ROBERT K. BEAN, OF WINTHROP, MASSACHUSETTS.

FLY-NET.

1,218,829.  Specification of Letters Patent.  Patented Mar. 13, 1917.

Application filed November 20, 1916. Serial No. 132,423.

*To all whom it may concern:*

Be it known that I, ROBERT K. BEAN, a subject of the King of England, residing at Winthrop, in the county of Suffolk and State of Massachusetts, have invented certain new and useful Improvements in Fly-Nets; and I do declare the following to be a full, clear, and exact description of the invention, such as will enable others skilled in the art to which it appertains to make and use the same.

My invention relates to improvements in nets designed to protect horses against flies and the like and the object thereof is to provide a device of this class which will practically cover the animal including his neck, legs and stomach as well as the parts usually covered by the ordinary net.

With this general object in view the invention resides in certain novel features of construction and in unique combinations of parts to be hereinafter fully described and claimed, the description being supplemented by the accompanying drawings which constitute a part of this application and in which:—

Figure 1:
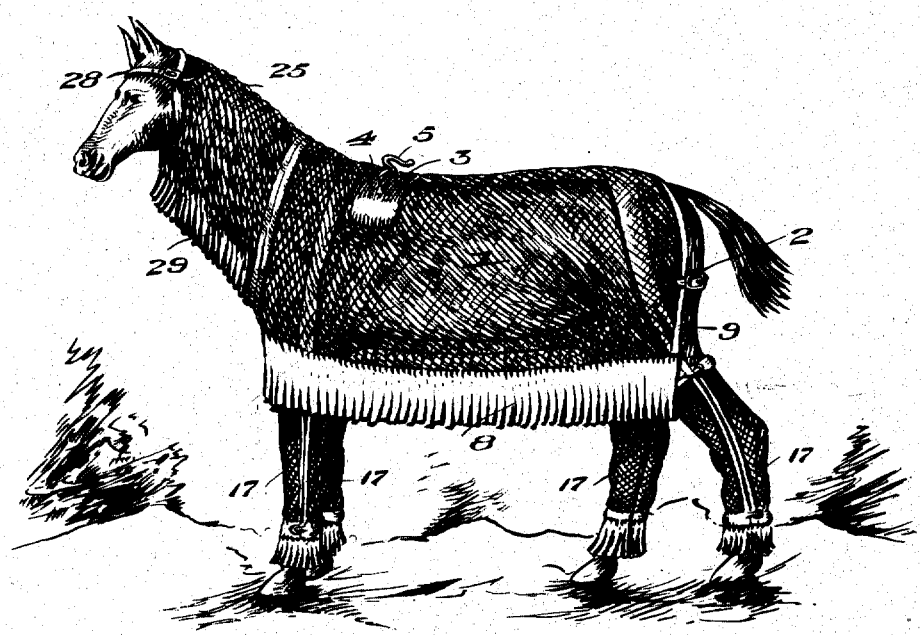
Figure 1 is a perspective view of the invention applied.
Figure 2:
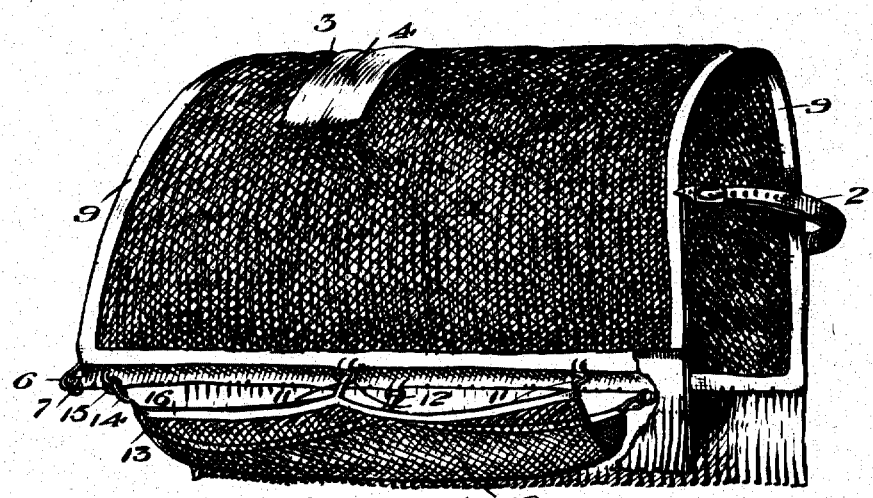
Fig. 2 is a similar view of the nets employed on the animal's back and stomach.
Figure 3:
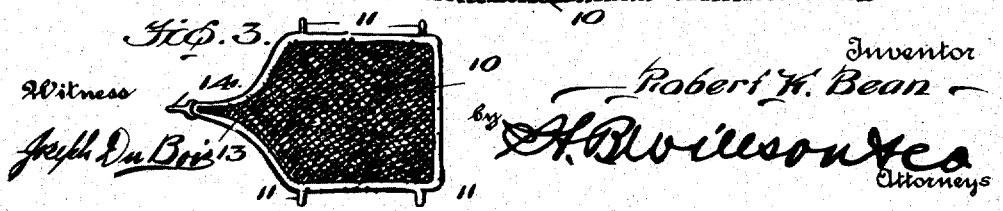
Fig. 3 is a plan view of the stomach net.

In specifically describing the construction shown in the drawings above briefly described, similar characters will be employed to designate corresponding parts throughout the several views and reference will be herein made to the numerous elements by their respective indices. To this end the numeral 1 designates a back net preferably having a breeching strap 2, said net also having a sheet of leather or the like 3 near its front end to overlie the usual back band of a harness, this sheet being formed with a slot 4 through which the usual check rein hook 5 of said back band may project. The front corners of the net 1 are adapted to be brought together around the base of the horse's neck, said corners being provided with a snap hook 6 and an eye 7 for connecting them.

The lower edges of the net 1 are preferably provided with fringe or the like 8 which may be constructed as shown or may be in the form of leather strands secured to the net in any preferred manner. The entire net 1 is preferably though not necessarily bound by leather or other suitable material as indicated at 9 to prevent stretching and fraying thereof.

A net 10 is adapted to extend beneath the stomach of the horse and to be secured by snap hooks 11 to eyes 12 on the lower edges of the net 1, said net 10 having a pointed forwardly projecting extension 13 whose front end is equipped with a snap hook 14 to engage an eye 15 adjacent the eye 7 on the net 1. The net 10 is also preferably bound with leather or the like as indicated at 16.

For protecting the animal's legs, a plurality of leg nets or leggings 17 are provided, said leggings being held in place by any preferred means.

A net 25 is adapted to be passed around the horse's neck and to have its edges secured together by snap hooks or the like, not shown, said net having a head strap 28 to be applied as shown in Fig. 1 and preferably having fringe or the like 29 located under the horse's neck when in use. The net 25 like the others above described is preferably bound with leather or other suitable material as indicated at 30.

From the foregoing it will be obvious that the improved net will well protect a horse against flies and the like, it being understood that any of the common types of head nets may be employed if found desirable.

I claim:

A device for protecting horses against flies and the like, said device comprising a back net adapted to extend over the horse's back and downwardly along his sides, fasteners at the front corners of said net for securing said corners together beneath the horse's neck, an auxiliary net adapted to be positioned beneath the animal's belly and having a pointed extension at its front end adapted to extend between his front legs, means for securing said pointed extension to the front end of the back net at the lower edge thereof, and means for securing the side edges of said auxiliary net to the lower edges of the back net.

In testimony whereof I have hereunto set my hand in the presence of two subscribing witnesses.

ROBERT K. BEAN.

Witnesses:
GERTRUDE A. MANNING,
EDWARD A. THOMAS.

Copies of this patent may be obtained for five cents each, by addressing the "Commissioner of Patents, Washington, D. C."